United States Patent [19]

Jdid et al.

[11] Patent Number: 4,634,580
[45] Date of Patent: Jan. 6, 1987

[54] PROCESS FOR THE PURIFICATION OF WET-PROCESS PHOSPHORIC ACID BY REMOVAL OF CADMIUM

[75] Inventors: El A. Jdid, Vandoeuvre les Nancy; Pierre Blazy, Nancy; Jacques Bessiere, Gondreville; Antoine Floreancig, Pierre Benite, all of France

[73] Assignee: Uranium Pechiney, France

[21] Appl. No.: 681,846

[22] Filed: Dec. 14, 1984

[30] Foreign Application Priority Data

Dec. 23, 1983 [FR] France ............................... 83 21039

[51] Int. Cl.⁴ ...................... C01G 11/00; C01B 25/18; C22B 17/04
[52] U.S. Cl. ..................................... 423/100; 423/10; 423/101; 423/321 R; 423/321 S; 423/DIG. 14; 75/2; 75/101 BE; 75/121; 75/108; 210/688
[58] Field of Search .............. 75/2, 101 BE, 121, 108; 423/321 r, 321 S, 100, 99, 101, 10, DIG. 14; 210/688

[56] References Cited

U.S. PATENT DOCUMENTS

| | | | |
|---|---|---|---|
| 4,374,805 | 2/1983 | Worthington et al. | 423/321 R |
| 4,394,360 | 7/1983 | Schrodter et al. | 423/321 R |
| 4,452,768 | 6/1984 | Gradl et al. | 423/321 S |
| 4,457,848 | 7/1984 | Schimmel et al. | 423/321 S |
| 4,466,948 | 8/1984 | Schimmel et al. | 423/321 S |
| 4,503,016 | 3/1985 | Schimmel et al. | 423/321 S |

*Primary Examiner*—John Doll
*Assistant Examiner*—Robert L. Stoll
*Attorney, Agent, or Firm*—McDougall, Hersh & Scott

[57] ABSTRACT

A process for the removal of cadmium contained in wet-process phosphoric acid by flotation by means of a cadmium-collector anionic surface active agent and an injected gas in the presence of other impurities including iron and possibly uranium which is characterized in that, in order to improve the removal of cadmium, the iron contained in the phosphoric acid in the trivalent state is reduced to the divalent state before the cadmium collector is introduced into the medium to be purified by flotation.

The collector agent is selected from the group of dithiophosphoric acid esters and the alkali metal salts thereof.

19 Claims, 1 Drawing Figure

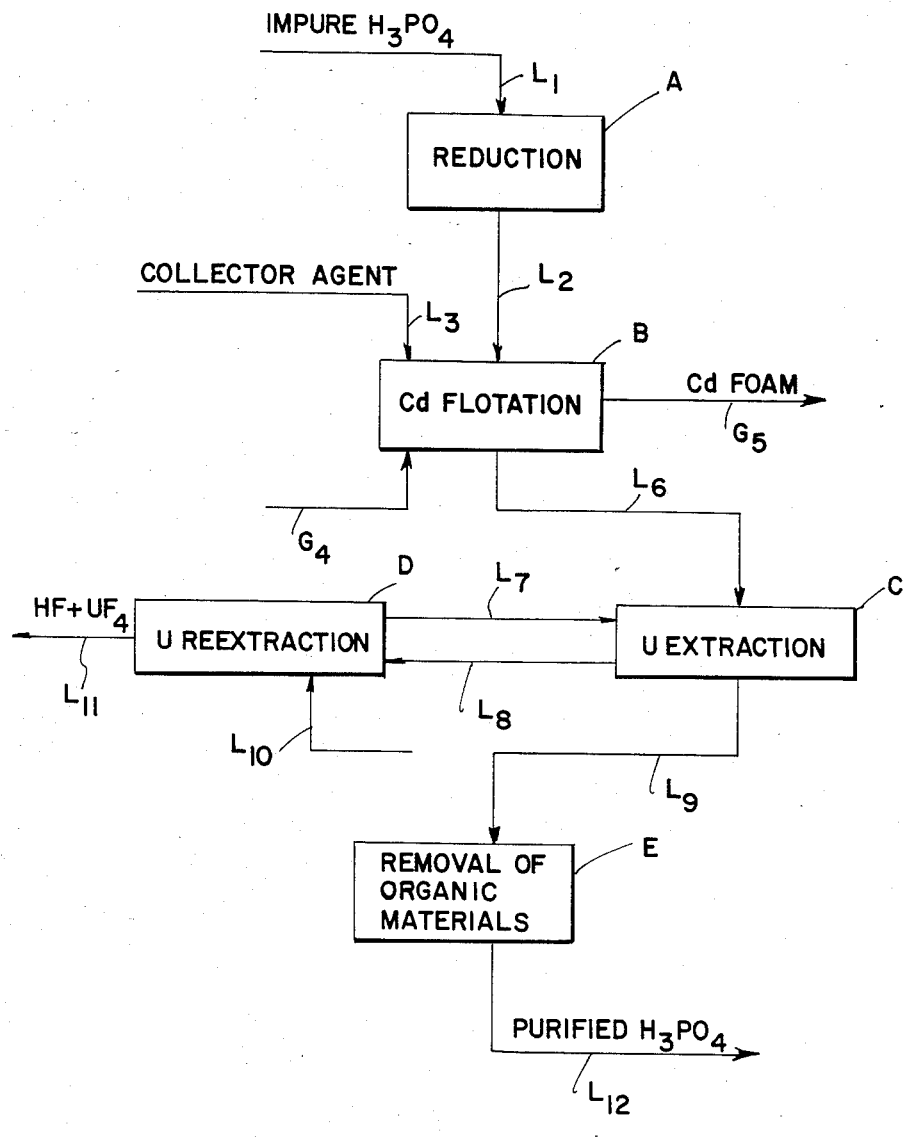

PROCESS FOR THE PURIFICATION OF WET-PROCESS PHOSPHORIC ACID BY REMOVAL OF CADMIUM

The present invention concerns a process for the purification of wet-process phosphoric acid produced by the acid attack on a phosphate ore containing cadmium as a troublesome impurity, being a toxic impurity whose presence gives rise to limitations in regard to the commercialization of the acid or the products deriving therefrom.

Wet-process phosphoric acid is produced by the acid attack on phosphate ore and it accordingly contains a large amount of impurities such as iron in the divalent and trivalent forms, cadmium and uranium. Some of the impurities present may be such that they can be put into useful form as is the case with uranium, or they must be removed in order not to be prejudicial to uses of that acid, as is the case with cadmium.

The specialist literature has already proposed processes for removing cadmium from phosphoric acid in order at least partially to free it of that toxic element which goes into solution in the operation of subjecting the phosphate ore to the acid attack, and which constitutes an environmental risk.

Among the known processes in the prior art, some involve for example removing the cadmium by liquid-liquid extraction by means of a suitable solvent while others for example use ionic flotation after the addition of an anionic surface active agent which collects the cadmium.

Among the processes which involve liquid-liquid extraction of the cadmium, one of them, as described in German Pat. No. 3 127 900, provides for removing the cadmium by means of an organophosphorus solvent such as for example diethylhexyldithiophosphoric acid. Such a process requires burdensome and substantial technological means which cause it to be generally unattractive in regard to the recovery of a metal element which is of low commercial value, totally out of proportion to the real value of the cadmium.

Among the other processes, those which involve ionic flotation are much simpler and therefore less burdensome to use. One such process concerning "the ionic flotation of uranium and cadmium in concentrated phosphoric acid media" was presented to the "SIM Congress" in Paris (from Sept. 26 to Oct. 1, 1983) and published in the corresponding report at pages 617 to 631. That publication describes ionic flotation treatment of solutions of synthetic phosphoric acid which is free from iron and impurities but artificially charged with cadmium by means of anionic surface active agents, such as sodium diethyldithiophosphate. Under those conditions, the cadmium is removed without major difficulty, with high levels of yield which may exceed 95%.

However, the application of such a process to the treatment for removing cadmium from a wet-process phosphoric acid, that is to say, an industrial production acid which is obtained by the acid attack on a phosphate ore containing impurities including iron and cadmium is found to be poor since the acid, after the flotation treatment, still contains a substantial amount of cadmium, corresponding to a level of removal yield which may often be less than 10% of the initial content.

Faced with the above-mentioned disadvantages, the applicants, continuing their research in this area, sought to improve the process for removing cadmium from industrial phosphoric acid by a flotation operation, by investigating the underlying causes of such a failure when the process for flotation of a synthetic phosphoric acid is transposed to industrial production phosphoric acid.

In the course of their experimental research which led them to the process according to the invention, the applicants sought to apply the flotation process to the removal of cadmium which is present as impurities in industrial phosphoric acid. For that purpose, they introduced various known surface active agents, for example sodium diethyldithiophosphate, into the industrial production phosphoric acid, and caused the formation, in the acid, of a fine dispersion of bubbles of air which should have entrained the cadmium impurity to the surface of the solution, in the form of a recoverable foam. The applicants then found that the cadmium impurity was generally not entrained in that fashion and therefore remained in the phosphoric acid solution.

Pursuing their research, by carrying out a treatment for reducing the industrial phosphoric acid before introducing the surface active agent, the applicants found that it was then possible to remove the cadmium impurity by ionic flotation, and the cadmium impurity could be recovered in the foams at the surface of the treated phosphoric acid solution.

On analysing those results, the applicants found that the degree of removal of cadmium by flotation increased in proportion to a reducing content of trivalent iron in the industrial phosphoric acid solution treated.

According to the invention, the process for the removal of cadmium contained in wet-process phosphoric acid by flotation by means of a cadmium-collector anionic surface active agent and an injected gas in the presence of other impurities including iron and possibly uranium, is characterised in that, in order to improve the removal of cadmium, the iron contained in the phosphoric acid, in the trivalent state, is reduced to put it in the divalent state before the cadmium collector is introduced into the medium to be purified by flotation.

Advantageously, the operation of reducing the trivalent iron in solution in the industrial phosphoric acid can be carried out using known means, as may be the case in processes for the recovery of uranium from wet-process phosphoric acid, such as electrolytic reduction, the addition of iron in powder form or by circulating industrial phosphoric acid over metal scrap preferably containing iron.

The temperature at which the operation of reducing the iron is carried out is not critical but, as the industrial phosphoric acid produced is generally hot, the reduction temperature is generally between 20° and 100° C. and preferably between 40° and 80° C., which corresponds to a temperature normally employed in the production of phosphoric acid.

The operation of reducing the trivalent iron present in the industrial phosphoric acid is continued until the ratio $[Fe^{2+}]/[Fe^{3+}]$ obtained is at least equal to 4 and is preferably between 6 and 40 for reasons of economy in order to promote the removal of cadmium and at the same time reduce the consumption of the collector agent. However, that preferred range is not to be considered as limitative, since the degree of extraction of cadmium increases as the proportion of iron III approaches zero.

The collector agent is of known type. It is generally selected from the group of thiophosphoric acid esters or their alkali metal salts, having the general formula: $(RO)_2PS_2H$, wherein R may be for example an aliphatic radical having the general formula: $C_nH_{2n+1}$, wherein n is between 1 and 8 such as alkali metal diethyldithiophosphates, diisobutyldithiophosphates, diisoamyldithiophosphates and di-2-ethylhexyldithiophosphates, said alkali metal salts being essentially those of sodium or potassium used alone or in the form of mixtures, or an aromatic radical such as for example alkali metal diphenyldithiophosphates and alkali metal cresyldithiophosphates.

In practice, the dithiophosphoric acid esters or alkali metal salts thereof which are used as a collector agent may be pure products but they are often commercially available in an impure state. In that case, they may be used alone or as a mixture, inspite of their impure state.

The collector agent is used in a proportion of at least two molecules of the agent for a gram atom of cadmium contained in the industrial phosphoric acid and preferably between 3 and 10 molecules of the collector agent for a gram atom of cadmium, which amount of collector agent is in practice adjusted in dependence on the acid medium to be treated.

After the surface active collector agent has been introduced into the industrial phosphoric acid, a fine dispersion of gas bubbles is caused to form within the acid by any suitable means.

Then, a foam containing the precipitated cadmium is formed at the surface of the phosphoric acid solution; the cadmium is separated and isolated.

The gas used for producing the foam which is collected at the surface of the phosphoric acid solution may desirably be air, an inert gas such as nitrogen or carbon dioxide.

In addition, for the purposes of controlling the formation and separation of the foam, it may be an attractive proposition also to introduce into the phosphoric acid solution a known foaming agent such as cetylmethylammonium bromide or else an anti-foaming agent such as sulphonic or oleic acids, which are well known to the man skilled in the art.

The process is applied to the treatment of wet-process phosphoric acid of various levels of concentration, generally being between 25% and 42% of $P_2O_5$.

The wet process phosphoric acid may also contain uranium. Therefore, it may be an attractive proposition for a treatment for putting the uranium into useful form to be associated with the treatment for removing the cadmium in accordance with the invention.

In a situation where the operation of reducing FeIII to FeII has already been carried out, the uranium present in the industrial phosphoric acid is in the reduced form of U IV and may be extracted from that acid in that form by means of a suitable solvent such as pyro-octylphosphoric acid, before or after the operation of removing the cadmium by flotation has been carried out. Where it is preferred to extract non-reduced uranium in the form U VI, the operation of reducing the FeIII to FeII is performed after extraction of the uranium by means of a suitable solvent such as for example a mixture of trioctylphosphine oxide and di-2-ethylhexylphosphoric acid.

Finally, the organic materials introduced by the cadmium collector agent or the solvents used for the extraction of uranium, which may contaminate the industrial phosphoric acid resulting from those treatments, may be removed by a separation operation such as centrifuging, filtering over absorbent material such as for example activated carbon, gypsum, etc.

The invention will be better appreciated by reference to the following description of a diagram showing purification of phosphoric acid by the removal of cadmium and the recovery of uranium in tetravalent form.

In the diagram, industrial wet-process phosphoric acid which is therefore impure is introduced as indicated at $L_1$ into a reduction region A which, in the present case, is filled with iron scrap. The reduced phosphoric acid $L_2$ is then placed in a flotation cell into which are introduced a surface active collector agent $L_3$ which is sodium diethyldithiophosphate and gas $G_4$ which may be air, by means of a suitable piece of apparatus (not shown).

The cadmium-charged foams $G_5$ are collected at the surface of the cell B and removed from the treatment cycle while the phosphoric acid from which the cadmium has been removed issues from the cell B at $L_6$.

The phosphoric acid from which the cadmium has been removed is then treated in a counter-flow mode in the extraction battery C where it is brought into contact with an extraction solvent $L_7$ formed by a diluent of the kerosene type and an extracting agent for U IV, such as octylpyrophosphoric acid. The substances issuing from C are a uranium-charged organic phase $L_8$ and an aqueous phase $L_9$ which is wet-process phosphoric acid from which cadmium and uranium have been removed.

The uranium contained in the organic phase $L_8$ is re-extracted in D by means of a solution $L_{10}$ of HF, causing the precipitation of $UF_4$ which is recovered in the form of the suspension $L_{11}$.

The phosphoric acid $L_9$ is finally treated in E, over gypsum, to remove the organic materials present.

Issuing from E is an aqueous phase $L_{12}$ of phosphoric acid from which cadmium and uranium have been removed and which is free of the organic materials introduced at B and C by the cadmium flotation and uranium extraction treatment operations.

EXAMPLE 1

This Example shows the influence of the preliminary reduction of iron on the removal of the cadmium contained in the phosphoric acid.

The acid used in this experiment is a phosphoric acid which is obtained by the sulphuric attack on phosphate from Taiba (Senegal). The composition of the acid is as follows:

| | |
|---|---|
| $P_2O_5$ | 29.1% by weight |
| $Fe^{3+}$ | 7000 mg/l |
| $Fe^{2+}$ | 50 mg/l |
| U | 103 mg/l |
| Cd | 73.5 mg/l |

In a first series of experiments, the acid was treated as it is at a temperature of 60° C. using increasing amounts of sodium diethyldithiophosphate, and then subjected to a flotation operation by introducing a fine dispersion of bubbles of nitrogen.

Table I gives the cadmium content of the purified acid obtained after removal of the foams.

In a second series of experiments, the phosphoric acid was previously treated by means of iron powder with 2.5 g of iron per liter of acid. After treatment, the acid contained 9.0 g/l of $Fe^{2+}$ and 0.5 g/l of $Fe^{3+}$, giving a $Fe^{2+}/Fe^{3+}$ ratio of 18.

The acid was then treated at 60° C. with increasing amounts of sodium diethyldithiophosphate as in the first series of experiments. Table I compares the results obtained in the two series of experiments.

TABLE I

| [diethyldithiophosphate] [cadmium] molar ratio | Without reduction Purified acid | | With reduction Purified acid | |
|---|---|---|---|---|
| | Cadmium mg/l | Purification yield % | Cadmium mg/l | Purification yield % |
| 2 | 72.8 | 0.95 | 35.1 | 52.2 |
| 3 | 72.6 | 1.20 | 5.04 | 93.1 |
| 4 | 66.4 | 9.65 | 1.45 | 93.0 |

This Example shows the influence of preliminary reduction of the iron, on the removal of cadmium by flotation.

A level of cadmium removal of 98% can be achieved by using 4 mols of diethyldithiophosphate per gram atom of cadmium. Without preliminary reduction, the removal of cadmium was less than 10%, with the same amount of diethyldithiophosphate.

EXAMPLE 2

This Example describes the process for the removal of cadmium and recovery of uranium and a wet-process phosphoric acid of the following composition:

| | |
|---|---|
| $P_2O_5$ | 28.5% by weight |
| $Fe^{3+}$ | 6500 mg/l |
| $Fe^{2+}$ | 100 mg/l |
| U | 107 mg/l |
| Cd | 70 mg/l |

In this Example, in a first stage, 200 l/h of phosphoric acid is treated in a reducing column A which is 100 mm in diameter, charged with scrap iron. The temperature of the acid is that of the stored acid issuing from the attack battery, being about 60° C.

At the outlet from the reducing column, the amounts of $Fe^{2+}$ and $Fe^{3+}$ in the phosphoric acid are respectively 8500 mg/l and 900 mg/l, giving a $Fe^{2+}/Fe^{3+}$ ratio of 9.45.

The acid is treated in a reaction vessel B into which are introduced 2 l/h of an aqueous solution of sodium diethyldithiophosphate containing 40 g/l, and a fine dispersion of air which entrains the precipitate that is formed to the surface. The substances collected are on the one hand cadmium-rich foams which are removed, and, on the other hand, a solution of phosphoric acid which now only contains 4 mg/l of cadmium, giving a cadmium purification yield of 94%.

The acid is then treated in a counter-flow mode with 15 l/h of an organic solution of kerosene containing 30 g/l of octylpyrophosphoric acid. The result obtained is a uranium-charged solvent containing 1.39 g/l of uranium and a solution of phosphoric acid from which uranium has been substantially removed, now containing only 4 mg/l of uranium.

The uranium contained in the organic solution is then re-extracted with 1.5 l/h of a 15% hydrofluoric acid solution. The uranium contained in the solvent which is precipitated in the form of $UF_4$ is recovered and the HF solution is recycled to the re-extraction operation after being returned to strength. The solvent from which the uranium has been removed is recycled to the extraction operation.

The acid from which the uranium has been removed, issuing from the reaction vessel C, is then filtered on a gypsum pre-layer for removing the organic materials which may remain in solution and which are introduced by the two cadmium flotation and uranium extraction treatment operations.

We claim:

1. A process for the removal of cadmium in wet-process phosphoric acid containing iron impurities in the trivalent state, comprising the steps of reducing said trivalent iron to a divalent state, introducing a cadmium-collector anionic surface active agent into said phosphoric acid to precipitate the cadmium, and separating the cadmium from said phosphoric acid by flotation.

2. A cadmium removal process according to claim 1 characterized in that the trivalent iron is reduced to divalent iron by electrolytic reduction or by the addition of iron or metal scrap containing same.

3. A cadmium removal process according to claim 1 or claim 2 characterized in that the reduction of FeIII is continued until the ratio $[Fe^{2+}]/[Fe^{3+}]$ obtained in the acid is at least equal to 4.

4. A cadmium removal process according to claim 1 characterized in that the reduction temperature is between 20° and 100° C.

5. A cadmium removal process according to claim 1 characterized in that the collector agent is selected from the group of dithiophosphoric acid esters or alkali metal salts thereof having the general formula: $(RO)_2PS_2H$, wherein R is an aliphatic radical having the formula $C_nH_{2n+1}$ wherein n is between 1 and 8, or R is an aromatic radical.

6. A cadmium removal process according to claim 5 characterized in that the dithiophosphoric acid esters are selected from the group consisting of diethylditiophosphates, diisobutyldithiophosphates, diisoamyldithiophosphates, di-2-ethylhexyldithiophosphates and alkali metal salts thereof.

7. A cadmium removal process according to claim 5 characterized in that the dithiophosphoric acid esters are selected from the group consisting of alkali metal diphenyldithiophosphates and dicresyldithiophosphates.

8. A cadmium removal process according to claim 1 characterized in that the amount of collector used is at least 2 molecules per gram atom of cadmium.

9. A cadmium removal process according to claim 1 characterized in that a foaming agent is also introduced into the phosphoric acid.

10. A cadmium removal process according to claim 9 wherein the foaming agent is cetylmethylammonium bromide.

11. A cadmium removal process according to claim 1 wherein the wet-process phosphoric acid contains uranium impurities in addition to the iron impurities.

12. A cadmium removal process according to claim 11 characterized by recovering the uranium present in the phosphoric acid by a liquid-liquid extraction operation.

13. A cadmium removal process according to claim 11 characterized in that the uranium is extracted in a form U IV by means of a solution of octylpyrophosphoric acid in kerosene.

14. A cadmium removal process according claim 11 characterized in that the uranium is extracted in the form U VI by means of a mixture of trioctylphosphine oxide and di-2-ethylhexylphosphoric acid in kerosene before the FeIII reduction treatment is carried out.

15. A cadmium removal process according to claim 11 characterized in that the organic materials contaminating the phosphoric acid after flotation of the cadmium and extraction of the uranium are removed by filtration over gypsum.

16. A cadmium removal process according to claim 1 or claim 2 characterized in that the reduction of FeIII is continued until the ratio $[Fe^{2+}]/[Fe^{3+}]$ obtained in the acid is between 6 and 40.

17. A cadmium removal process according to claim 1 characterized in that the reduction temperature is between 40° and 80° C.

18. A cadmium removal process according to claim 1 characterized in that the amount of collector used is between 3 and 10 molecules per gram atom of cadmium.

19. A cadmium removal process according to claim 1 characterized in that an anti-foaming agent selected from the group consisting of sulphonic and oleic acids is additionally introduced into the phosphoric acid.

* * * * *

UNITED STATES PATENT OFFICE
CERTIFICATE OF CORRECTION

Patent No. 4,634,580          Dated January 6, 1987

Inventor(s)          JDID, et al.

It is certified that error appears in the above-identified patent and that said Letters Patent are hereby corrected as shown below:

Column 5, line 13 should read -- 4   66.4   9.65   1.45   98.0 --.

Signed and Sealed this

Twenty-fourth Day of March, 1987

Attest:

DONALD J. QUIGG

Attesting Officer          Commissioner of Patents and Trademarks